United States Patent [19]

Murase et al.

[11] Patent Number: 5,639,196

[45] Date of Patent: Jun. 17, 1997

[54] FASTENING DEVICE WITH BOWL-SHAPED MAIN BODY PORTION AND LEAF SPRING CLIP FOR ENGAGING BOLT PASSING THROUGH OPENING IN BOWL-SHAPED MAIN BODY

[75] Inventors: Yoshihiro Murase; Hideaki Takagi; Hiromichi Mizuno, all of Aichi-ken; Tomomi Yoshida; Ken Kobayashi, both of Toyota, all of Japan

[73] Assignee: Aoyama Seisakusho Co., Ltd., Aichi-ken, Japan

[21] Appl. No.: 709,131

[22] Filed: Sep. 6, 1996

Related U.S. Application Data

[63] Continuation of Ser. No. 359,518, Dec. 20, 1994, abandoned.

[30] Foreign Application Priority Data

Dec. 24, 1993 [JP] Japan .................... 5-326491

[51] Int. Cl.⁶ ........................................ F16B 37/08
[52] U.S. Cl. ...................... 411/433; 411/366; 411/512
[58] Field of Search .......................... 411/433, 512, 411/541, 366, 437, 527, 525, 526, 432, 411, 414, 424

[56] References Cited

U.S. PATENT DOCUMENTS

| | | | |
|---|---|---|---|
| 2,345,053 | 3/1944 | Judd | 411/527 |
| 2,417,262 | 3/1947 | Morehouse | 411/512 |
| 2,417,263 | 6/1947 | Morehouse | 411/512 |
| 2,763,031 | 9/1956 | Rekettye | 411/525 |
| 3,046,828 | 7/1962 | Dzus | 411/527 |
| 3,352,341 | 11/1967 | Schertz | 411/433 |
| 3,507,182 | 4/1970 | Tinnerman | 411/432 |
| 3,623,192 | 11/1971 | Papazian | 411/512 |
| 4,325,178 | 4/1982 | Pruehs | 411/526 |
| 4,536,116 | 8/1985 | Murray | 411/432 |
| 4,618,300 | 10/1986 | Goebel | 411/433 |
| 4,830,560 | 5/1989 | Hirohata | 411/433 |
| 4,915,559 | 4/1990 | Wheeler | 411/424 |
| 5,098,242 | 3/1992 | Schaty | 411/433 |
| 5,190,424 | 3/1993 | Kazino | 411/414 |

FOREIGN PATENT DOCUMENTS

| | | | |
|---|---|---|---|
| 1286513 | 1/1962 | France | 411/512 |
| 2527023 | 12/1976 | Germany | 411/512 |

*Primary Examiner*—Steven N. Meyers
*Assistant Examiner*—Gary Estremsky
*Attorney, Agent, or Firm*—Frishauf, Holtz, Goodman, Langer & Chick

[57] ABSTRACT

A clamping member fastenable to a bolt, wherein the clamping member includes a bowl-shaped main body having a bolt-inserting opening formed through a bottom center portion thereof. A leaf spring clip is embedded integratedly in the bottom center portion of the bowl-shaped main body. The leaf spring clip includes a plurality of spring claws extending from a periphery of the bolt-inserting opening toward a center of the bolt-inserting opening in an oblique and upward direction. The plurality of spring claws are engagable with a bolt and fasten the clamping member to the bolt responsive to a direct pushing action of the main body of the clamping member over the bolt with the bolt passing through the bolt-inserting opening, without requiring any tools or rotating action of the clamping member relative to the bolt. The bolt has a thread thereon and the thread may have an upper surface portion formed into a convexly arched surface and a lower surface portion formed into a concavely arched surface, the thread being engagable with the plurality of spring claws such that the spring claws engage over the convexly arched upper surface portion of the thread of the bolt responsive to a direct pushing action of the main body of the clamping member over the bolt.

15 Claims, 3 Drawing Sheets

5,639,196

FASTENING DEVICE WITH BOWL-SHAPED MAIN BODY PORTION AND LEAF SPRING CLIP FOR ENGAGING BOLT PASSING THROUGH OPENING IN BOWL-SHAPED MAIN BODY

This application is a Continuation of application Ser. No. 08/359,518, filed Dec. 20, 1994 now abandoned.

BACKGROUND OF THE INVENTION

1. Field of the Invention

This invention relates to a fastening device which can be used in place of a fastening device comprising a bolt and a nut.

2. Background of the Invention

In the prior art, there have been generally used a bolt and a nut as a means for fixing a member to be fastened to a fastening member. In a fastening operation by a bolt and a nut, it is required to engage the nut with the bolt and to carry out a rotating operation by using a rotating tool so that there are problems that the fastening operation takes time and the nut itself is heavy to make weight saving difficult.

SUMMARY OF THE INVENTION

An object of the present invention is to provide a fastening device by which the above problems can be solved, a fastening operation can be carried out simply and rapidly and also weight saving can be achieved.

The fastening device of the present invention by which the above problems can be solved comprises a clamping member having a bolt-engaging portion with plural spring claws extending from the periphery of a pore toward a center in an oblique and upward direction; and a bolt.

In the preferred embodiment of the present invention, by using a clamping member which comprises a leaf spring clip having the bolt-engaging portion with the plural spring claws extending from the periphery of a pore toward a center in an oblique and upward direction being embedded integratedly in the center of the bottom of a basin- or bowl-shaped clamping main body made of a synthetic resin having a flange formed at the periphery of an opening, by using an embedding plate formed at the periphery of the leaf spring clip, the fastening device can be used for fastening a large-sized member such as a fastening device for a device of holding a spare tire.

In a further preferred embodiment of the present invention, by using a bolt which comprises a thread having an end surface formed into a convexly arched surface and the other surface formed into a concavely arched surface, the fastening device has particularly excellent fastening operatability and releasing operatability.

DESCRIPTION OF THE PREFERRED EMBODIMENTS

In the following, the present invention is explained in detail.

In the fastening device of the present invention, when the bolt is inserted into a member to be fastened and then the bolt is pushed with the bolt-engaging portion with the plural spring claws extending from the periphery of a pore toward a center in an oblique and upward direction being disposed at the end of the bolt, the bolt-engaging portion with the plural spring claws climbs over the thread of the bolt by elasticities of the respective spring claws, reaches a predetermined position and is elastically held at this position by the base surface of the thread of the bolt. Therefore, even if a force in a releasing direction is applied to the member to be fastened under this state, the ends of the respective spring claws extending in an oblique and upward direction are closed so as to be horizontal, whereby the member to be fastened is fixed with certainty by the bolt-engaging portion. The member to be fastened which has been fixed by the fastening device can be released by rotating the clamping member in the same manner as in releasing a nut to elevate the spring claws held by the lower surface of the thread of the bolt along the thread by rotation.

EXAMPLES

Figure 1:
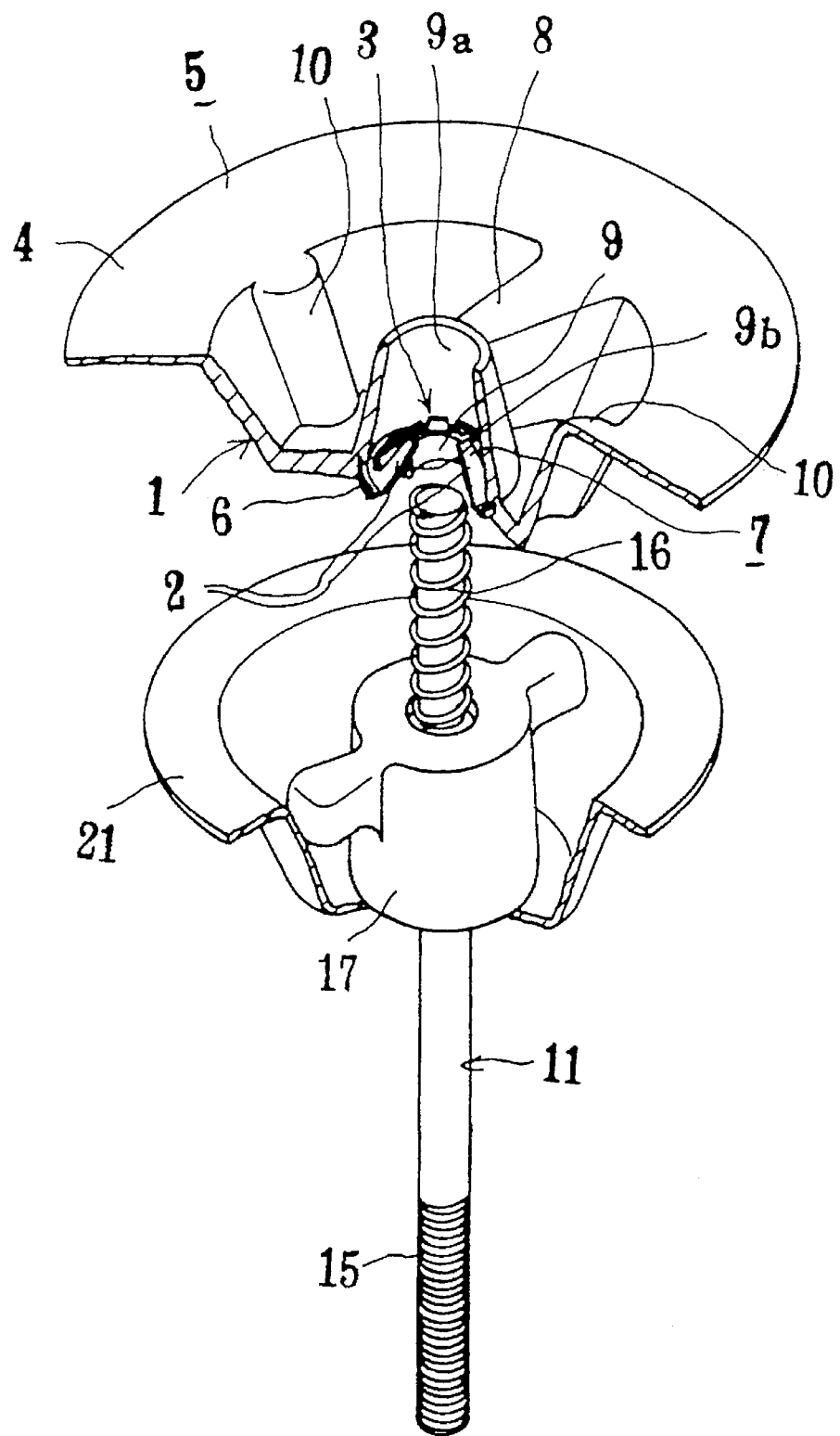
FIG. 1 is a partially cut perspective view showing one example of the present invention.

In the following, the present invention is described in detail by referring to a fastening device for a device of holding a spare tire shown in the drawings as one example. In FIG. 1, 1 is a clamping member having a bolt-engaging portion 3 with plural spring claws 2 extending from the periphery of a central pore toward a center in an oblique and upward direction; 11 is a locking bolt to be used in combination with the clamping member 1 in order to fix a spare tire T (shown in FIG. 2) to be housed in a tire-housing portion B (also shown in FIG. 2). In the clamping member 1, a centering guide 9b and a bolt-inserting opening or pore 9 are provided under a state that they are surrounded with a bolt-inserting short tube portion 9a molded integratedly with the bottom of a basin- or bowl-shaped clamping main body 5 made of a synthetic resin in the center of the bottom of the clamping main body 5 having a flange 4 formed at the periphery of an opening as a bearing surface; at the bottom of the bolt-inserting short tube portion 9a, a leaf spring clip 7 having a periphery at which an embedding plate 6 is formed and the plural spring claws 2 extending from the periphery of the central pore toward a center in an oblique and upward direction is embedded integratedly in the bottom (base portion) of the bolt-inserting short tube portion 9a by the embedding plate 6 under a state that the lower surface of the spring claws 2 can be contacted with and left from the inclined upper surface of the centering guide 9b; and the bolt-engaging portion 3 having the plural spring claws 2 is formed in the center. In FIG. 1, 8 is a holding grip formed between the inner surface of the basin- or bowl-shaped clamping main body 5 and the bolt-inserting short tube portion 9a, and 10 is a reinforcing rib formed on the side wall of the clamping member 1.

Figure 3:
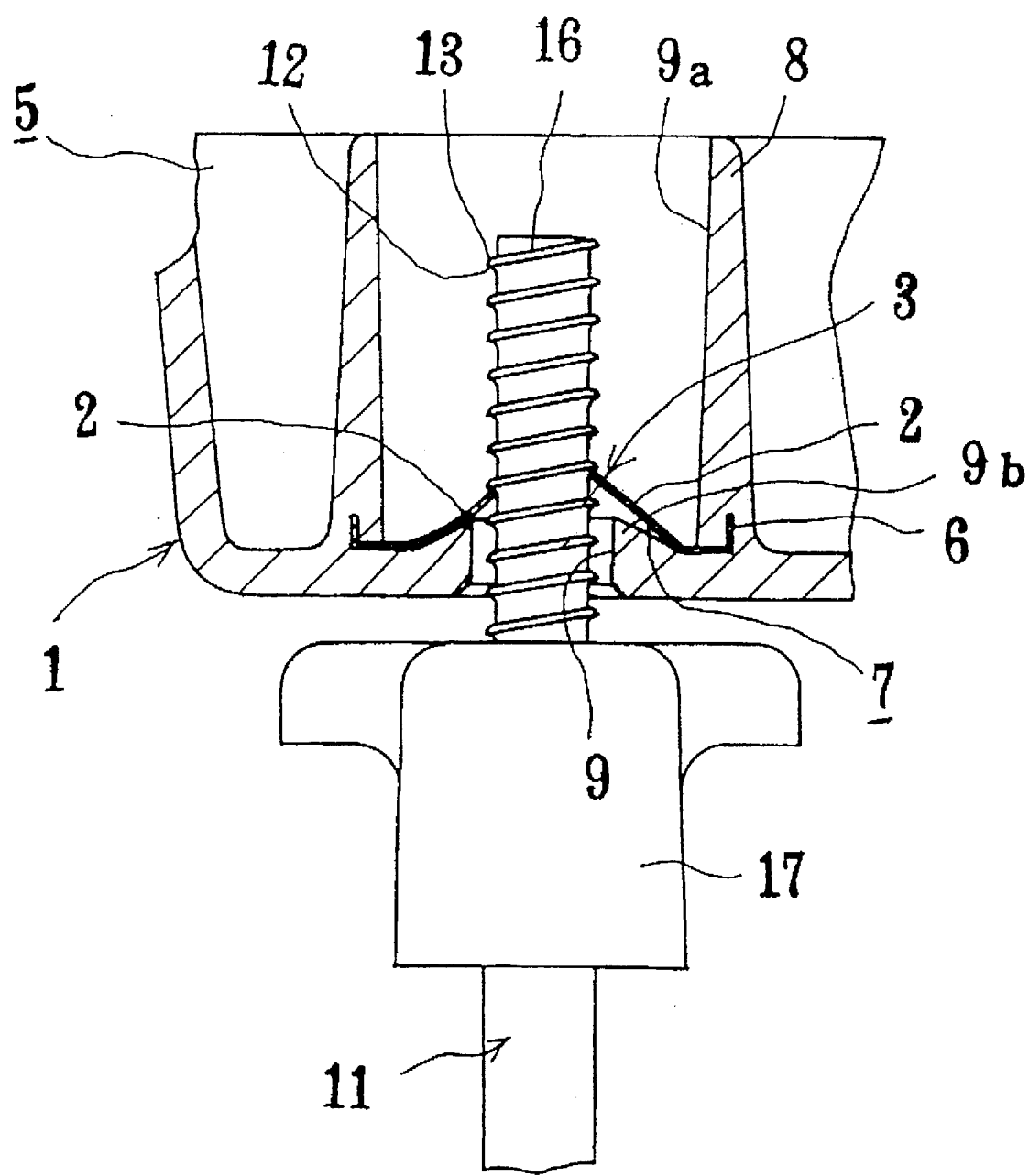
FIG. 3 is a sectional view showing a main portion of one example of the present invention.

In the locking bolt 11 to be used in combination with the clamping member 1, a threaded axis portion 15 with a conventional screwing thread is formed at a lower side (or a base end side); a threaded axis portion 16 with a clip-engaging thread is formed at a top end side; and a spare tire-engaging portion 17 made of a synthetic resin which also serves as a grip for a rotating operation is insert molded in the middle of the threaded axis portion 15 and the threaded axis portion 16. The clip-engaging thread of the threaded axis portion 16 is a thread having one surface portion formed into a convexly arched surface 13 (as shown in FIG. 3) and another surface portion formed into a concavely arched surface 12 (as shown in FIG. 3). In FIG. 1, 21 is a spare tire-engaging cap to be used when the spare tire-engaging portion 17 is small-sized.

Figure 2:
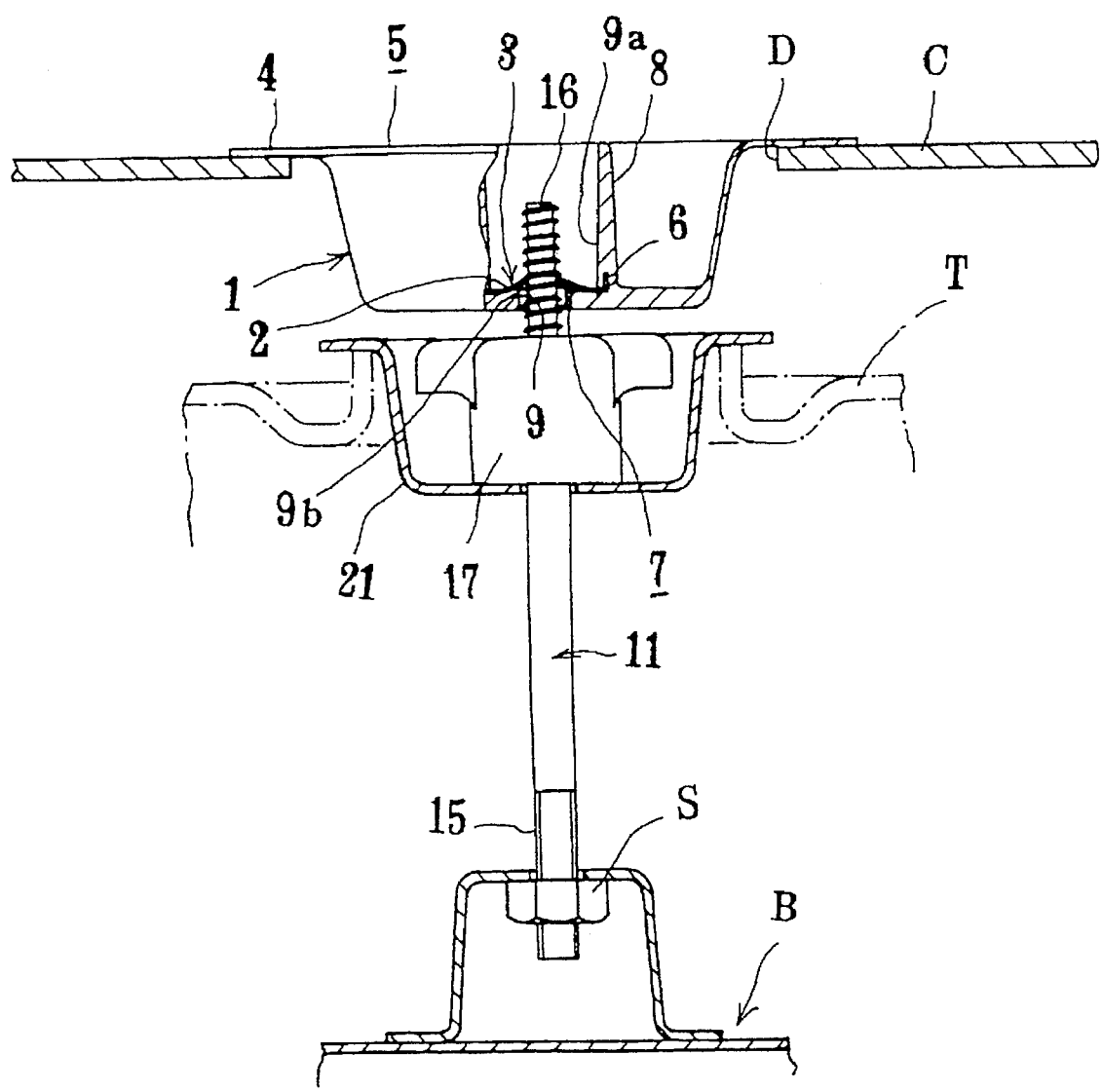
FIG. 2 is a partially cut perspective view showing a state of using one example of the present invention.

As shown in FIG. 2, in the fastening device constituted as described above, when the spare tire T is housed in the tire-housing portion B; the spare tire-engaging cap 21 is engaged with a wheel pore of the spare tire T; and the bolt 11 is inserted by screwing into a nut S formed at the bottom of the tire-housing portion B, the bearing surface of the spare tire-engaging portion 17 in the middle of the bolt 11 is contacted with the inner bottom surface of the spare tire-engaging cap 21 to fix and hold the spare tire T. Therefore, when the spare tire-housing portion B is covered with a cover C made of a board as a member to be fastened; and the clamping member 1 is inserted into the threaded axis 16 at the end of the bolt 11 from a through hole D by the bolt-engaging portion 3 with the respective spring claws 2, the spring claws 2 made of spring steel extending toward a center in an oblique and upward direction climbs over the convexly arched surface 13 which is the end surface of the thread of the threaded axis 16 by their own elasticities and easily reaches a predetermined position by being precisely guided by a centering guide 9b. As shown in FIG. 3, the plural spring claws 2 are elevated along a lead of the thread of a bolt; a part of them are contacted with the inclined upper surface of the centering guide 9b; and the other of them are elastically held with one-touch by the concavely arched surface 12 under a state that they are left from the inclined upper surface of the centering guide 9b.

After the cover C is pressed by a flange 4 of the basin- or bowl-shaped clamping main body 5 made of a synthetic resin as described above, if a force in a releasing direction is applied to the cover C, the ends of the respective spring claws 2 extending in an oblique and upward direction are closed so as to be horizontal, whereby the spring claws 2 bite the threaded axis 16 of the bolt 11 and therefore the cover C is not released. Thus, in order to release the spare tire T which has been fastened, the clamping member 1 is rotated while holding a holding grip 8 in the same manner as in loosing a nut to elevate the spring claws 2 elastically held by the concavely arched surface 12 of the thread of the bolt 11 along the concavely arched surface 12 by rotation, whereby the clamping member 1 is released; the cover C is released; the bolt 11 is released; the spare tire-engaging cap 21 is removed; and then the spare tire T is taken out from the tire-housing portion B.

In the above example, the clamping member 1 comprises the clamping main body 5 made of a synthetic resin having the bolt-engaging portion 3 with the plural spring claws 2 extending in an oblique and upward direction. However, the clamping member 1 may comprise a molded clamping main body 5 having a desired shape made of spring steel and having the bolt-engaging portion 3 with the plural spring claws 2 extending in an oblique and upward direction. The bolt 11 of the above example is described as a bolt in which the threaded axes 15 and 16 are formed at both ends of one axis, respectively. However, the bolt 11 may be a bolt in which the threaded axes 15 and 16 are connected by the spare tire-engaging portion 17 made of a synthetic resin which also serves as a grip for a rotating operation. Further, in the above example, by using the bolt 11 in which the upper surface of the thread formed on the threaded axis 16 is the convexly arched surface 13 and the other surface thereof is the concavely arched surface 12, the bolt-engaging portion 3 can be inserted smoothly and the respective spring claws 2 of the bolt-engaging portion 3 can be elastically held with certainty. However, a conventional thread may be used without any problem.

As can be clearly understood from the above description, the fastening device of the present invention comprises a clamping member having a bolt-engaging portion with plural spring claws extending from the periphery of a pore toward a center in an oblique and upward direction; and a bolt. In order to fasten a member to be fastened, when the clamping member is inserted into a bolt, the bolt-engaging portion of the clamping member can be easily inserted to reach a predetermined position of the bolt and then elastically held by a thread without using tools, whereby a fastening operation can be completed instantaneously. Further, the spring claws are elastically held by the thread so that a clamping main body is not loosened by vibration or the like even if a spring washer or the like is not used, and the clamping main body is not loosened unless it is rotated, whereby accidents caused by the unexpected release of the fastened member is prevented and extremely high safety can be obtained. In order to release the fastened member, it is required to carry out only a rotating operation in the same manner as in loosing a member fastened by a nut, whereby the fastening device of the present invention can be re-used. Further, a nut is not used so that large-scale weight saving can be achieved as compared with a fastening device using a bolt and a nut. By using the clamping member as described above which comprises a leaf spring clip having the bolt-engaging portion with plural spring claws extending from the periphery of a pore toward a center in an oblique and upward direction being embedded integratedly in the center of the bottom of a basin- or bowl-shaped clamping main body made of a synthetic resin having a flange formed at the periphery of an opening, by using an embedding plate formed at the periphery of the leaf spring clip, the fastening device is extremely effective as a device used for fastening a large-sized member such as a fastening device for a device of holding a spare tire. By using the bolt described above which comprises a thread having an end surface formed into a convexly arched surface and the other surface formed into a concavely arched surface, the fastening device has particularly excellent fastening operatability and releasing operatability, whereby utilizability can be heightened.

Thus, the fastening device of the present invention is practically valuable as a fastening device by which the problems in the prior art can be solved.

We claim:

1. A clamping member fastenable to a bolt, said clamping member comprising:

a bowl-shaped main body made of a molded synthetic resin;

a bolt-inserting opening formed through a bottom center portion of said bowl-shaped main body;

a leaf spring claws integral with said base portion and embedded integratedly in the bottom center portion of said bowl-shaped main body, and a plurality of metal spring claws integral with said base portion and extending from a periphery of said bolt-inserting opening toward a center of said bolt-inserting opening in an oblique and upward direction;

said plurality of spring claws being adapted to engage a bolt and fasten said clamping member thereto responsive to a direct pushing action of said main body of said clamping member, without requiring any tools or rotating action of said clamping member;

wherein said bolt-inserting opening includes an inclined upper support surface and wherein a lower surface of each of said spring claws can be in contact with or separated from the inclined upper support surface such that:

at least one spring claw is elastically lifted from the inclined upper support surface when a bolt is inserted in an insertion direction past the spring claw, the spring claws engaging the underside of the threads of the bolt to prevent removal of the clamping member from the bolt and, at least one of the spring claws is in contact with and supported by the inclined support surface when a force in a direction opposite to the insertion direction is applied to the bolt.

2. The clamping member according to claim 1, wherein said plurality of spring claws are adapted to releasably engage a bolt to releasably fasten said clamping member to a bolt.

3. The clamping member according to claim 2, wherein said plurality of spring claws are adapted to be releasable from a bolt responsive to a rotating action of said main body of said clamping member to unfasten said clamping member from a bolt.

4. The clamping member according to claim 1, wherein said bolt-inserting opening comprises:

a centering guide adapted to center said clamping member over a bolt for insertion of a bolt through said bolt-inserting opening; and a bolt-inserting short tube portion adapted to receive a bolt therethrough.

5. The clamping member according to claim 4, wherein said base portion of said leaf spring clip comprises an embedding plate formed at a periphery of said leaf-spring clip, said embedding plate being embedded integratedly in a bottom portion of said bolt-inserting short tube portion of said bolt-inserting opening.

6. The clamping member according to claim 1, further comprising a flange formed at a periphery of said bowl-shaped main body, said flange comprising a bearing surface.

7. The clamping member according to claim 1, wherein said plurality of spring claws are made of spring steel.

8. A fastening device comprising:

(i) a clamping member including:

a bowl-shaped main body made of a molded synthetic resin, a bolt-inserting opening formed through a bottom center portion of said bowl-shaped main body, and a leaf spring clip including a base portion embedded integratedly in the bottom center portion of said bowl-shaped main body, and a plurality of metal spring claws integral with said base portion and extending from a periphery of said bolt-inserting opening toward a center of said bolt-inserting opening in an oblique and upward direction; and (ii) a bolt including a thread thereon, the thread having an upper surface portion formed into a convexly arched surface and a lower surface portion formed into a concavely arched surface, said thread being engagable with said plurality of spring claws such that said clamping member is fastenable to said bolt responsive to a direct pushing action of said main body of said clamping member over said convexly arched upper surface portion of said bolt with said bolt passing through said bolt-inserting opening, without requiring any tools or rotating action of said clamping member relative to said bolt;

wherein said bolt-inserting opening of said clamping member includes an inclined upper support surface and wherein a lower surface of each of said spring claws can be in contact with or separate from the inclined upper support surface such that:

at least one spring claw is elastically lifted from the inclined upper support surface when a bolt is inserted in an insertion direction past the spring claw, the spring claws engaging the underside of the threads of the bolt to prevent removal of the clamping member from the bolt and, at least one of the spring claws is in contact with and supported by the inclined support surface when a force in a direction opposite to the insertion direction is applied to the bolt.

9. The fastening device according to claim 8, wherein said plurality of spring claws and said thread are releasably engagable such that said clamping member is releasably fastenable to said bolt.

10. The fastening device according to claim 9, wherein said plurality of spring claws are releasable from said thread responsive to a rotating action of said main body of said clamping member to unfasten said clamping member from said bolt.

11. The fastening device according to claim 8, wherein said bolt-inserting opening comprises:

a centering guide for centering said clamping member over said bolt for insertion of said bolt through said bolt-inserting opening; and a bolt-inserting short tube portion for receiving said bolt therethrough.

12. The fastening device according to claim 11, wherein said base portion of said leaf spring clip comprises an embedding plate formed at a periphery of said leaf-spring clip, said embedding plate being embedded integratedly in a bottom portion of said bolt-inserting short tube portion of said bolt-inserting opening.

13. The fastening device according to claim 8, wherein said clamping member further comprises a flange formed at a periphery of said bowl-shaped main body, said flange comprising a bearing surface.

14. The fastening device according to claim 8, wherein said plurality of spring claws are made of spring steel.

15. The fastening device according to claim 8, wherein said concavely arched lower surface portion of said thread engages said spring claws to maintain said bolt engaged with said clamping member.

* * * * *